(No Model.)
D. FRISBIE.
SAFETY ATTACHMENT FOR ELEVATORS.
No. 265,954. Patented Oct. 17, 1882.
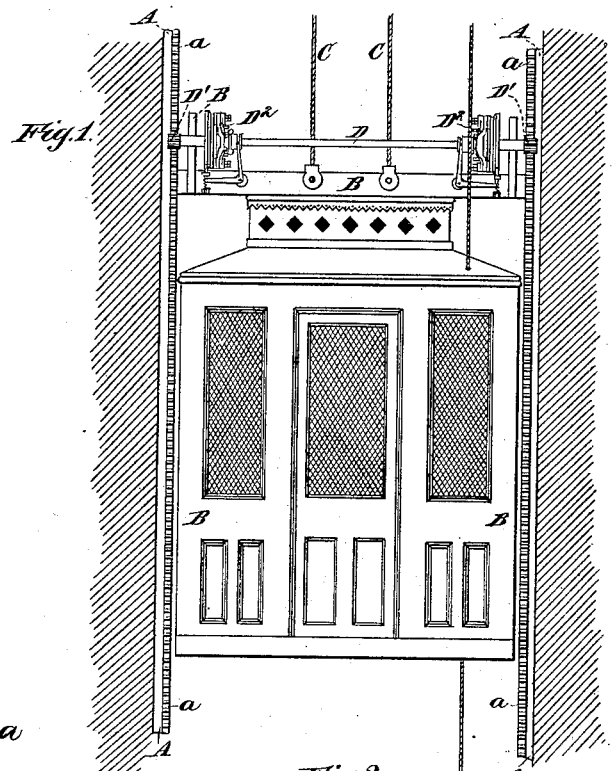
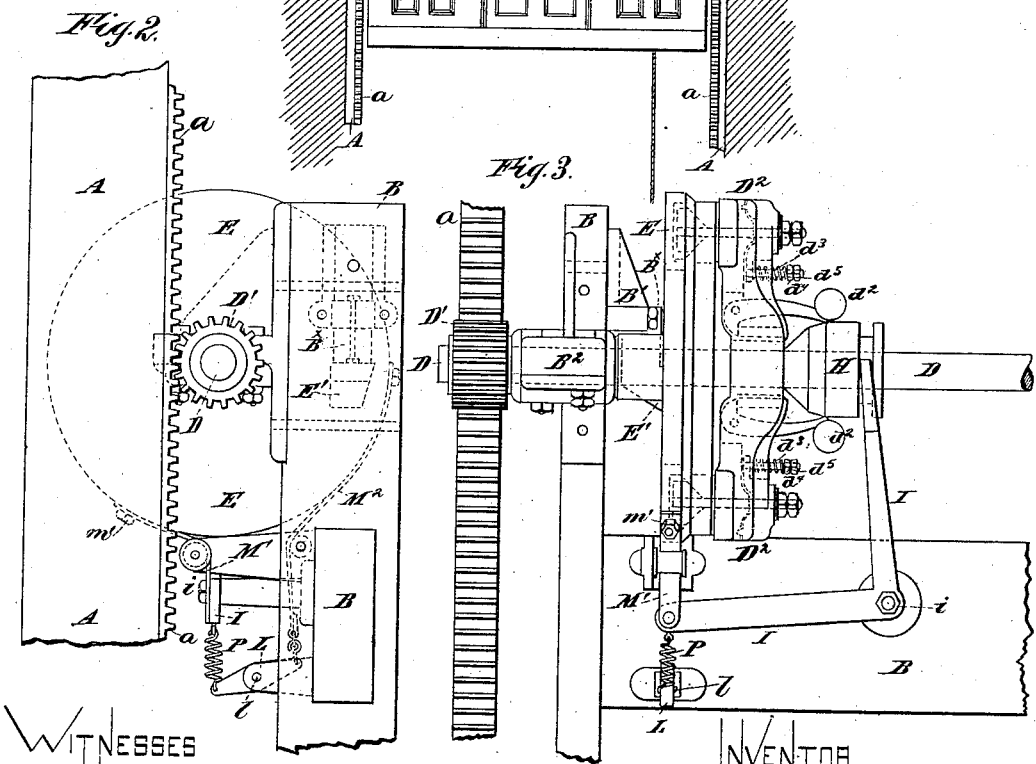
WITNESSES
Charles R. Searle,
B. E. Stafford.
INVENTOR
Dennis Frisbie
by his attorney
J. S. Stetson

UNITED STATES PATENT OFFICE.

DENNIS FRISBIE, OF PHILADELPHIA, PENNSYLVANIA.

SAFETY ATTACHMENT FOR ELEVATORS.

SPECIFICATION forming part of Letters Patent No. 265,954, dated October 17, 1882.

Application filed April 3, 1882. (No model.)

*To all whom it may concern:*

Be it known that I, DENNIS FRISBIE, formerly of New Haven, in the county of New Haven and State of Connecticut, now residing in the city and county of Philadelphia, in the State of Pennsylvania, have invented certain new and useful Improvements Relating to Safety Attachments for Elevators, of which the following is a specification.

The invention may be applied to either passenger or freight elevators traversing in the ordinary manner up and down, guided by fixed uprights. I carry on the elevator-carriage a sufficiently-strong transverse shaft, having a pinion on each end engaging in corresponding racks extending up and down on the fixed guideway. Under ordinary conditions this shaft revolves idly in one direction and the other as the elevator is raised and depressed. I mount on this shaft a loose wheel having a strong stop or arm arranged to engage with a strong stop or arm on the elevator-carriage. I provide means for grasping this loose wheel and holding it by a friction-clutch arranged to be of no effect under ordinary conditions, but to instantly and strongly engage the wheel and compel it to turn with the shaft in case the elevator-carriage moves too fast. I employ a form of clutch substantially like that represented in the patent to A. B. Bean, 1877, now generally known as the "Frisbie clutch." The levers of this clutch are weighted, so as to be strongly affected by centrifugal force. They are held inward by delicately-adjustable springs. These springs are adjusted so that the rotation of the shaft at the ordinary speed shall have no effect. When an elevator-rope breaks or any derangement occurs which allows the elevator-carriage to drop the falling movement will rotate the shaft with increasing rapidity. So soon as the speed has reached a point where the centrifugal force on the arms of the clutch overcomes the resistance of the nicely-adjusted springs the arms will fly outward and engage the clutch with the loose wheel, compelling it to turn therewith. Before the loose wheel has effected one complete revolution its arm will be brought in contact with the arm on the carriage and its motion will be arrested. These two arms prevent the loose wheel from revolving, the clutch engages the loose wheel to the shaft, and the pinions on the shaft engage with the fixed rack on the framing. Thus the descent of the carriage is arrested.

So far as yet described, the device would be of great utility in checking a sudden fall of the carriage; but without some further provision the arresting of the motion would, by extinguishing the centrifugal force, allow the arms of the friction-clutch to be again drawn together by their springs, which movement would liberate the loose wheel and allow the shaft to revolve again independently thereof. The elevator-carriage would therefore commence to descend, and would continue to do so until it again acquired a sufficiently-high velocity to again throw out the weighted arms by the centrifugal force and again engage the clutch. This action would continue intermittently, or, perhaps, with an approximately-uniform motion, until the carriage had reached the bottom.

I can use the invention with some advantage thus conditioned; but I have provided a further device which engages the clutch permanently on the occurrence of a sufficient derangement to set the device in operation. The partial turning of the loose wheel is made to effect an axial movement of a cone on the shaft, which thrusts itself between the arms of the lever and holds them strongly apart after the motion of the carriage is stopped. It is preferable, for several reasons, to employ two racks on the upright framing, one on one side of the carriage and the other on the other, and to mount a similar gear-wheel on each end of the transverse shaft.

The following is a description of what I consider the best means of carrying out the invention.

The accompanying drawings form a part of this specification.

Figure 1 is a side elevation, showing the entire elevator-carriage and the adjacent parts on a small scale. Figs. 2 and 3 show the novel parts on a larger scale. They are elevations taken at right angles to each other.

Similar letters of reference indicate like parts in all the figures.

A A is the fixed frame-work, and *a a* are racks of iron or steel strongly bolted or otherwise secured thereon.

B is the frame-work of the elevator car or carriage, guided by the frame-work in any ordinary or suitable manner.

C is the hoisting-rope, operated in any ordinary or suitable manner to raise and lower the car, as required.

D is a transverse shaft, supported in bearings in the carriage B, and provided at each end with a pinion, D', engaged in the corresponding rack, $a$. The shaft D carries also a Frisbie clutch, $D^2$, the levers of which are weighted, as indicated by $d^2$. This clutch engages with a wheel, E, of similar size mounted loosely on the shaft D. This wheel E is provided with a strong stop, E', and by the gravity of that stop, and also by the tension of a spring, G, acting through a strap, G', riveted to the periphery, as indicated, tends to stand always with the stop E' near its lowest position. There is a strong arm, B', fixed on the carriage B and equipped with a massive spring of india-rubber, as indicated by $B^\times$, adapted to receive the blow of the stop E' whenever the wheel E is turned by the engagement of the clutch $D^2$ therewith. If the rope C breaks and allows the car to fall, or if through any other derangement the car moves much above the ordinary rate of lowering, the arms $d^2$ will be thrown outward by centrifugal force in opposition to the tension of the springs $d^3$, and the clutch $D^2$ will engage with the wheel E and compel it to turn. So soon as it has turned sufficiently to bring its stop E' in contact with the arm B' its further motion will be arrested, and the wheel E, being thus prevented from revolving, the friction-clutch $D^2$ will either arrest or retard the descent of the carriage.

$d^4$ and $d^5$ are respectively nuts and jam-nuts, which control the tension of the springs $d^3$. These springs tend to draw the loaded ends of the levers $d^2$ together and to keep the clutch out of engagement with the wheel E. By adjusting the nuts $d^4$ and jam-nuts $d^5$ the tension of these springs $d^3$ may be adjusted with great delicacy. They should be set so that the levers $d^2$ will be held inward or together by a force only a little in excess of the centrifugal force when the car is running at its ordinary speed. A little more rapid motion of the car in either direction causes the centrifugal force of the weights $d^2$ to overcome the tension of the springs $d^3$ and to engage the clutch. This result is not likely to happen when the car is moving in the ordinary manner; but so soon as any derangement shall allow the carriage to fall, or even to move downward more rapidly than is consistent with safety, the clutch acts promptly and arrests the motion. Under these conditions the force with which the clutch $D^2$ will engage with the wheel C, and thus the force with which the descent of the carriage would be retarded, will depend on the centrifugal force felt by the arms $d^2$. Whenever the carriage slackens its motion so as to nearly or quite extinguish that force the springs $d^3$ will draw in the arms, and the clutch will relax so as to allow an increase of motion. When the velocity becomes too high the centrifugal force, throwing out the arms $d^2$, will increase the friction, and by engaging $D^2$ more strongly with E retard the motion. The apparatus may be operated in this manner, if preferred, in which case the carriage will descend with moderate speed to the bottom. For most situations, however, I prefer to employ the additions now to be described, and which insure an immediate locking of the arms $d^2$ in the extended position and the firm clutching of the parts $D^2$ and E together. This insures a rigidly-stationary condition of the carriage until the proper repairs have been effected and the machine is ready to be again worked in the ordinary manner. This locking of the parts in the clutched position is effected by the cone H, which is free to move endwise on the shaft D, and is controlled by a forked upright arm of a bell-crank lever, I, which is pivoted to the carriage at the point $i$. The lower arm engages directly with the wheel E by means of a strap, M', which traverses partially around a guide-pulley and is attached to a point in the periphery of the wheel E by means of a bolt, $m'$. A corresponding strap, $M^2$, is attached at another point on the periphery of the wheel E, and, leading partially around a guide-pulley, extends backward and connects to a lever, L, which turns on a pivot, $l$, carried on the carriage B. The opposite end of the lever L is connected by a spring, P, to the lever I, as shown. When an accident occurs and the carriage commences to fall, so soon as the shaft D acquires an improperly high velocity, and the loaded levers $d^2$ are thrown outward by the centrifugal force, the effect of the engagement with the wheel E and the turning of the latter therewith is not only to bring its arm E' into strong contact with the rubber $B^\times$ on the arm B', but also to change the position of the straps M' $M^2$. It slackens the strap M' and tightens the strap $M^2$. This rocks the lever L on its center $l$, and through the tension of the spring P pulls strongly downward the lower arm of the lever I with the effect to turn that lever partially around on its center $i$, and to thrust the cone H hard over against the clutch-wheel $D^2$. This movement holds the arms $d^2$ reliably apart after the falling motion of the carriage is arrested. When a new rope has been applied or the proper repairs have been made and the machine is ready to start the attendant may remove the center $i$, thus setting the lever I and the cone H at liberty. So soon as the cone H has been moved out sufficiently far the clutch-levers $d^2$ are drawn together by the springs $d^3$, and the clutch $D^2$ with the connected shaft D and gear-wheels D', as also the wheel E, are set at liberty. Thus conditioned the carriage B is made to depend again upon the rope C to be raised and lowered, the wheel E partially rotates, influenced by the gravity of the stop E' and the tension on the strap M', so as to bring the arm E' out of contact with the arm B', and all is again in the same condition as before.

A strong casting, $B^2$, is fitted on the carriage B adjacent to the shaft D. It is of such form as to stand on the side of the upright A opposite to the rack $a$. It holds the parts reliably in position and guards against the pinions D′ slipping out of engagement with the racks $a$.

Modifications may be made in the forms and proportions of the details.

A portion of the invention may be used without the whole.

I can operate the locking-cone H with some success with a rigid connection of the lever L to the lever I; but I prefer the spring P, as it avoids the necessity for nice adjustment of the point to which the cone H will be advanced when the wheel is arrested by the engagement of its stop E′. The carriage is always arrested with the stops E′ B′ in contact. If the friction-clutch is so adjusted that the arms $d^2$ will move apart to a greater or less extent, the cone H, and consequently the bell crank lever I, is liable to be arrested in various positions. The spring P allows for any discrepancy in these motions.

In place of the rubber spring $B^\times$, I can use a spiral or other suitable forms of spring; or the stops B′ E′ may be allowed to strike directly together.

My invention insures the arresting of the falling motion of the carriage gradually and gently, instead of abruptly and violently. The softness of the arrest is due not so much to the spring B* between the stops D′ and E′ as to the necessary and natural action of the Frisbie clutch $D^2$. Its engagement with the wheel E is gentle, and allows a sliding of the parts one upon the other, so as to relieve the machinery from concussion.

I can use other forms of friction-clutch than the Frisbie. I can use a positive instead of a frictional clutch; but I prefer all the parts as represented.

I claim as my invention—

1. In a safety attachment for elevators, the loaded levers $d^2$ and friction-clutch $D^2$, operated thereby, in combination with the shaft D and gear-wheel D′, carried on an elevator-carriage, and with a rack, $a$, on the fixed guideway A, arranged to serve as herein specified.

2. The carriage B, shaft D, and pinion or pinions D′, engaging in the rack or racks $a$ on the fixed frame-work, in combination with each other and with the friction-clutch $D^2$, having arms $d^2$ arranged to be engaged by centrifugal force, and with the springs $d^3$, adjusting-nuts $d^4$, and jam-nuts $d^5$, arranged to serve as herein specified.

3. In a safety attachment for elevators, the shaft D, carrying one or more pinions, D′, engaging with one or more fixed racks, $a$, in combination with a friction-clutch, $D^2$, engaged by centrifugal force when the proper velocity is exceeded, and with the loose wheel E, having an arm or stop, E′, and with the cone H, bell-crank I, and straps M′ $M^2$, arranged to serve as herein specified.

4. In a safety attachment for elevators, the combination, with the shaft D, pinion D′, and friction-clutch $D^2$, of the loose wheel E, having an arm, E′, engaging with an arm, B′, on the carriage B through an elastic cushion, $B^\times$, and with a strap, $M^2$, bell-crank I, and cone H for holding the friction-clutch engaged after the motion is arrested, and with the spring G and strap G′, controlling the loose wheel E while the mechanism is out of action, as herein specified.

In testimony whereof I have hereunto set my hand, at Philadelphia, Pennsylvania, this 25th day of March, 1882, in the presence of two subscribing witnesses.

DENNIS FRISBIE.

Witnesses:
   WM. LARZELERE,
   JOHN F. KRUSE.